United States Patent
Guy et al.

(10) Patent No.: US 8,627,465 B2
(45) Date of Patent: Jan. 7, 2014

(54) AUTOMATIC INFERENCE OF WHITELIST-BASED VALIDATION AS PART OF STATIC ANALYSIS FOR SECURITY

(75) Inventors: Lotem Guy, Hod Hasharon (IL); Marco Pistoia, Amawalk, NY (US); Takaaki Tateishi, Yamato (JP); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/088,711

(22) Filed: Apr. 18, 2011

(65) Prior Publication Data

US 2012/0266247 A1 Oct. 18, 2012

(51) Int. Cl.
 G06F 21/00 (2013.01)
(52) U.S. Cl.
 USPC .................... 726/22; 726/23; 726/24; 726/25
(58) Field of Classification Search
 USPC ....................................................... 726/22–25
 See application file for complete search history.

(56) References Cited

U.S. PATENT DOCUMENTS

| | | | |
|---|---|---|---|
| 7,509,684 B2 | 3/2009 | McDonald et al. | |
| 7,530,107 B1 | 5/2009 | Ono et al. | |
| 7,788,235 B1 | 8/2010 | Yeo | |
| 2008/0184208 A1 | 7/2008 | Sreedhar et al. | |
| 2009/0125976 A1 | 5/2009 | Wassermann et al. | |
| 2009/0158430 A1 | 6/2009 | Borders | |
| 2009/0183261 A1* | 7/2009 | Peinado et al. ................. 726/24 |
| 2009/0249489 A1 | 10/2009 | Livshits et al. | |
| 2009/0328009 A1 | 12/2009 | Scholz et al. | |
| 2010/0058475 A1 | 3/2010 | Thummalapenta et al. | |
| 2010/0131721 A1* | 5/2010 | Title et al. ........................ 711/154 |
| 2010/0251214 A1* | 9/2010 | Bohling et al. ................ 717/124 |
| 2010/0287613 A1 | 11/2010 | Singh et al. | |

OTHER PUBLICATIONS

Randive, Komal; "Apparatus for String Overflow Exploitability Verification Using Static Analyis", IPCOM000201330D, Nov. 11, 2010.
Ganesh et al.; "Taint-Based Directed Whitebox Fuzzing", ICSE, May 16-24, 2009, pp. 474-484.
Halfond et al.: "WASP: Protecting Web Applications Using Positive Tainting and Syntax-Aware Evaluation", IEEE, vol. 34, Iss.1, Jan.-Feb. 2008, pp. 65-81.

(Continued)

*Primary Examiner* — Kaveh Abrishamkar
*Assistant Examiner* — Ayoub Alata
(74) *Attorney, Agent, or Firm* — Harrington & Smith; Louis J. Percello

(57) ABSTRACT

A method includes performing taint analysis of a computer program and determining an original set of paths from sources to sinks. Each path corresponds to a vulnerability. The method includes determining for each variable whose type is a collection and is accessed in one of the paths in the original set of paths whether the variable points to a concrete value whose internal state is not tainted according to the taint analysis. The method further includes, for each of the variables whose type is a collection found not to be tainted according to the taint analysis, determining all points in the computer program where a membership check against the collection is performed. The method also includes, for each of the points, determining corresponding paths and removing those paths from the original set of paths to create a reduced set of paths. Apparatus and computer readable program products are also disclosed.

18 Claims, 6 Drawing Sheets

(56) References Cited

OTHER PUBLICATIONS

Huang et al.; "Vulnerabilities Static Detection for Web Applications with False Positive Suppression", ICITIS, Dec. 17-19, 2010, pp. 574-577.

Tang et al.; "Dynamic Taint Analysis for Vulberability Exploits Detection", ICCET, vol. 2, Apr. 16-18, 2010, pp. 215-218.

Ouyang, Weiwei; "Privacy-Aware: Tracking and Protecting-Sensitive Information Using Automatic Type Inference", ICITIS, Dec. 17-19, 2010, pp. 665-668.

Tripp et al., "TAJ Effective Taint Analysis of Web Applications", PLDI'09, Jun. 15-20, 2009, 7 pgs.

* cited by examiner

AUTOMATIC INFERENCE OF WHITELIST-BASED VALIDATION AS PART OF STATIC ANALYSIS FOR SECURITY

BACKGROUND

This invention relates generally to analysis of software programs, and, more specifically, relates to static analysis of software programs.

Static analysis for security is an area enjoying broad adoption. The prospect of scanning the code of a Web application (for instance) to detect security vulnerabilities is very appealing. This is true first because the analysis is conservative (which means that there are no false-negative findings, at least in theory), and second because the scanning process is very efficient (compared to a dynamic analysis). That is, the scanning process can operate on partial, uncompiling, or undeployable code. The greatest disadvantage of static analysis for security is the cost the analysis has to pay for being conservative: There is typically a large number of false reports.

There are multiple techniques to improve the precision of static-analysis techniques, but these techniques normally come at the cost of making the technique more expensive, and thus less scalable. In particular, when it comes to static analysis for security, the ability to automatically infer which parts of the code act as information-flow downgraders, thereby sanitizing or validating user input, is crucial for the report to be precise. Otherwise, even if the application takes actions to secure its code against attacks, the analysis—failing to acknowledge these measures—flags spurious vulnerabilities.

SUMMARY

In an exemplary embodiment, a method includes performing taint analysis of a computer program and determining an original set of paths from sources to sinks. Each path corresponds to a vulnerability because taint flows from a source in the path to a sink in the path. The method includes determining for each variable whose type is a collection and is accessed in one of the paths in the original set of paths whether the variable points to a concrete value whose internal state is not tainted according to the taint analysis. The method further includes, for each of the variables whose type is a collection found not to be tainted according to the taint analysis, determining all points in the computer program where a membership check against the collection is performed. The method also includes, for each of the points, determining corresponding paths and removing those paths from the original set of paths to create a reduced set of paths. Apparatus and computer readable program products are also disclosed.

DETAILED DESCRIPTION

Figure 1:
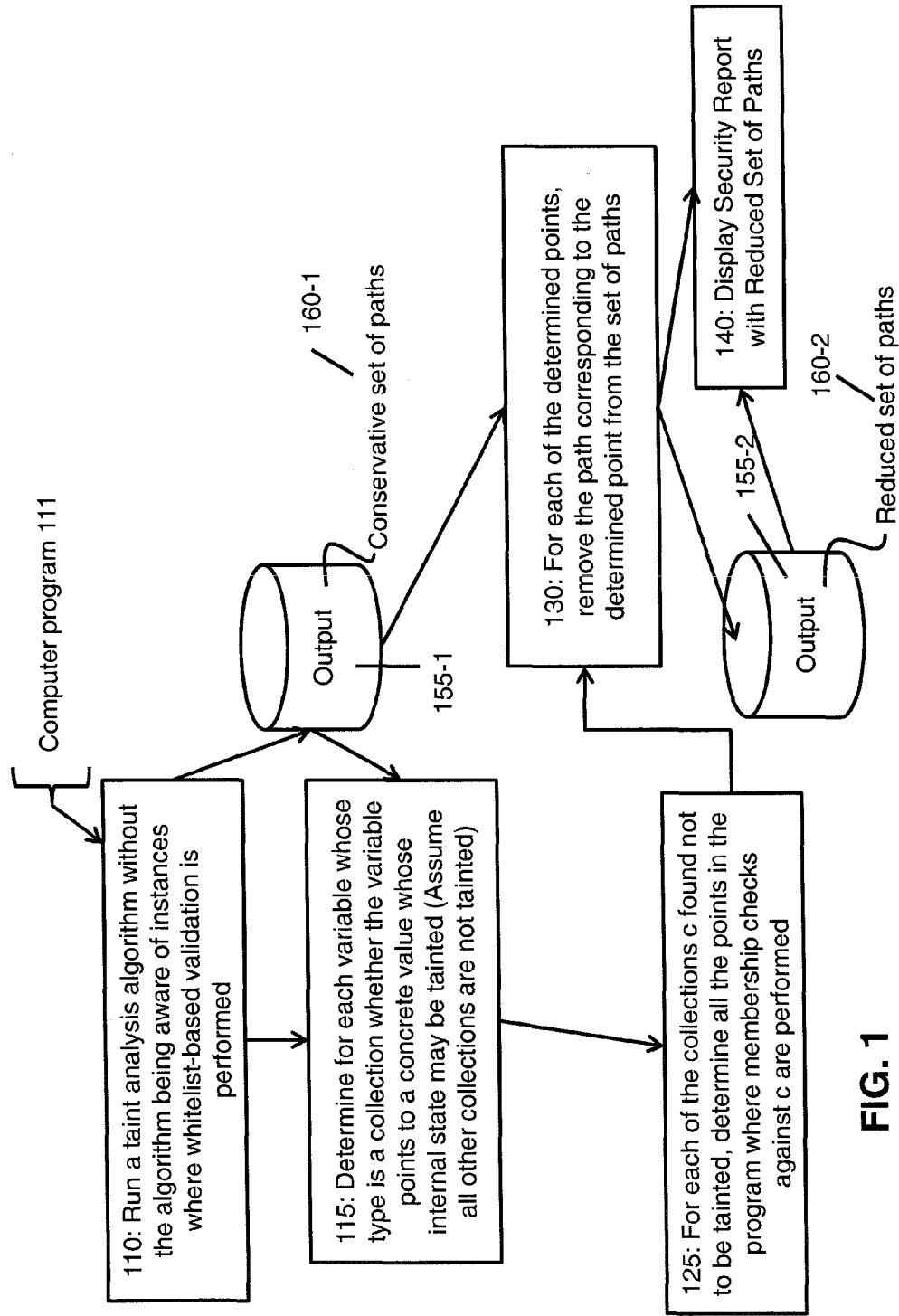
FIG. 1 is a flowchart of an exemplary method for automatic inference of whitelist-based validation as part of static analysis for security

As described in part above, a problem can occur in static analysis of computer programs in that flows through information-flow downgraders may still be flagged as vulnerabilities even though the flows have been properly operated on by the information-flow downgraders. Information-flow downgraders include sanitizers and validators. Sanitizers modify their input and make the input safe to be used. Meanwhile, validators simply check whether their input is or is not safe to be used, thereby allowing the programs using validators to either accept or reject, respectively, the input. A whitelist is a set of legal values. That is, white-list based validators perform membership checks to ensure that input values are members of the set of legal values.

With regard to the problem that flows through information-flow downgraders may still be flagged as vulnerabilities even though the flows have been properly operated on by the information-flow downgraders, it is helpful to consider a concrete code example (in JAVA, which is a programming language and computing platform):

```
1: String msgFormat = request.getParameter("msgFormat");
2: ...
3: if (validMessageFormats.contains(msgFormat)) {
4:     response.getWriter( ).println(msgFormat);
5: }
```

The naïve technique for the problem of identifying the whitelist-based validation performed at line 3 (three) is based on the string-analysis family of algorithms (performed, e.g. by a string analysis engine), which produce a sound approximation of the runtime values string variables may assume. The technique using a string analysis includes the following steps:

1. At line 1, use variable msgFormat as a seed, and submit a query to the string analysis engine on the set of runtime values the variable may assume.

2. At line 3, to understand which values may reach line 4 (i.e., the body of the "if" condition), submit a query to the string analysis engine asking for all the concrete values that may be stored in the container pointed to by validMessageFormats.

3. Assert that msgFormat can only point to one of these values at line 4.

If one of the values to which msgFormat may evaluate is unsafe with respect to the set of security attacks of interest, then a violation is flagged. Therefore, a conservative yet coarse analysis that simply ignores whitelist-based validation would flag a vulnerability of, e.g., type cross-site scripting (XSS) on the flow (1, 4), even though the white-list based validation at line 3 should ensure that there is no XSS. As is known, XSS allows malicious Web users to inject code into Web pages viewed by other users. This vulnerability is currently the most important vulnerability in the space of Web applications, comprising roughly 80 percent of all documented security breaches. Thus, a false positive may occur if string analysis is used.

It may also be possible for the string-analysis-based technique to avoid this false positive, but at a prohibitively expensive cost: computing all the string values that may flow into validMessageFormats requires an expensive and precise whole-program analysis, which can be problematic especially in the case of Web applications, which are multithreaded by design. That is, multithreading leads to state-space explosion, as all feasible interleavings of statements from different threads need to be taken into account.

Herein, a much cheaper and simpler approach is proposed, which relies on, in an exemplary embodiment, running a taint analysis twice. In the first execution, it is established whether untrusted user inputs (henceforth, tainted values) reach validMessageFormats. If not, then one can safely assume validMessageFormats to maintain a set of values controlled by the Web application. Then, in a second run, membership checks are soundly treated against validMessageFormats as a form of whitelist-based validation, and a conclusion is made that there is no issue to be reported.

As explained above, exemplary solutions described herein address a problem that is, on the one hand, of great importance, and on the other hand, cannot be solved in a straightforward manner due to the prohibitive cost of the naïve solution. This is the reason why so far, none of the industrial/academic taint-analysis algorithms of which the inventors are aware has given treatment to this problem. The result, unfortunately, is a very high rate of false positives. The analysis assumes that the developer has done nothing to validate/sanitize untrusted inputs, where in fact, the whitelist-based endorsement pattern is quite common, and is considered the best form of sanitization/validation. This recommendation comes from the Open Web Application Security Consortium (OWASP), as well as from security experts at IBM (International Business Machines) Watchfire (a division of IBM under the Rational division).

Herein is presented a highly efficient, exemplary solution to the problem of automatically identifying instances of whitelist-based validation. An exemplary solution includes the following operations (see FIG. 1):

1. Run a taint analysis algorithm "in the dark", i.e., without the algorithm being aware of instances where whitelist-based validation is performed. (block 110). The taint analysis algorithm is performed on computer program 111 and is performed statically (i.e., the computer program 111 is not executed). It should be noted that all of the blocks in FIG. 1 may be performed statically. The computer program 111 may include object code, byte code, source code, executable code, and library code and may not be a complete program. That is, the computer program may be simply be a portion of code and may not be operational. The methods of FIG. 1 may be performed, e.g., by computer readable program code executed by one or more processors. There are several commercial taint-analysis tools, including "IBM Rational AppScan Source Edition" and HP's (Hewlett-Packard's) "Fortify 360". There are also academic papers on taint analysis, such as Tripp, et al., "TAJ: Effective Taint Analysis of Web Applications", Programming Language Design and Implementation (PLDI) (2009). These tools and papers may be used for performing the taint analysis used herein. Nonetheless, for completeness, a simple example of an exemplary method for performing block 110 is shown in FIG. 2. Assuming the taint analysis to be sound, this would produce a conservative approximation of the actual set of vulnerabilities in the Web application. The set of vulnerabilities is indicated as a conservative (or original) set 160-1 of paths through the computer program 111. For the concrete code example given above, block 110 should determine paths where taint flows into the collection validMessageFormats or into the sink response.getWriter( ).println(•). Block 110 also produces other exemplary output 155-1, exemplary details of which are described below.

2. Examine the output 155-1 computed by the taint-analysis algorithm, and determine (block 115) for each variable whose type is a collection (e.g., set, array, map, etc.), whether according to the taint-analysis output 155-1, the variable may point to a concrete value whose internal state may be tainted. That is, at least one of the elements in the container pointed to by the collection may be tainted. A concrete value is a runtime object (as opposed to its abstract representation by the taint analysis). A "collection" is defined according to its static type (e.g., a concrete class implementing java.util.Collection). A user specification defining more collection types, on top of those governed by the types in a standard library, can be included, as is described below. In the example given above, validMessageFormats is a collection. All other collections are assumed not to be tainted (block 115). It is noted that in block 115, the block can be considered as determining for each variable whose type is a collection whether the variable points to a concrete value whose internal state is not tainted according to the taint analysis. An exemplary method for performing block 115 is presented in FIG. 3.

Figure 4:
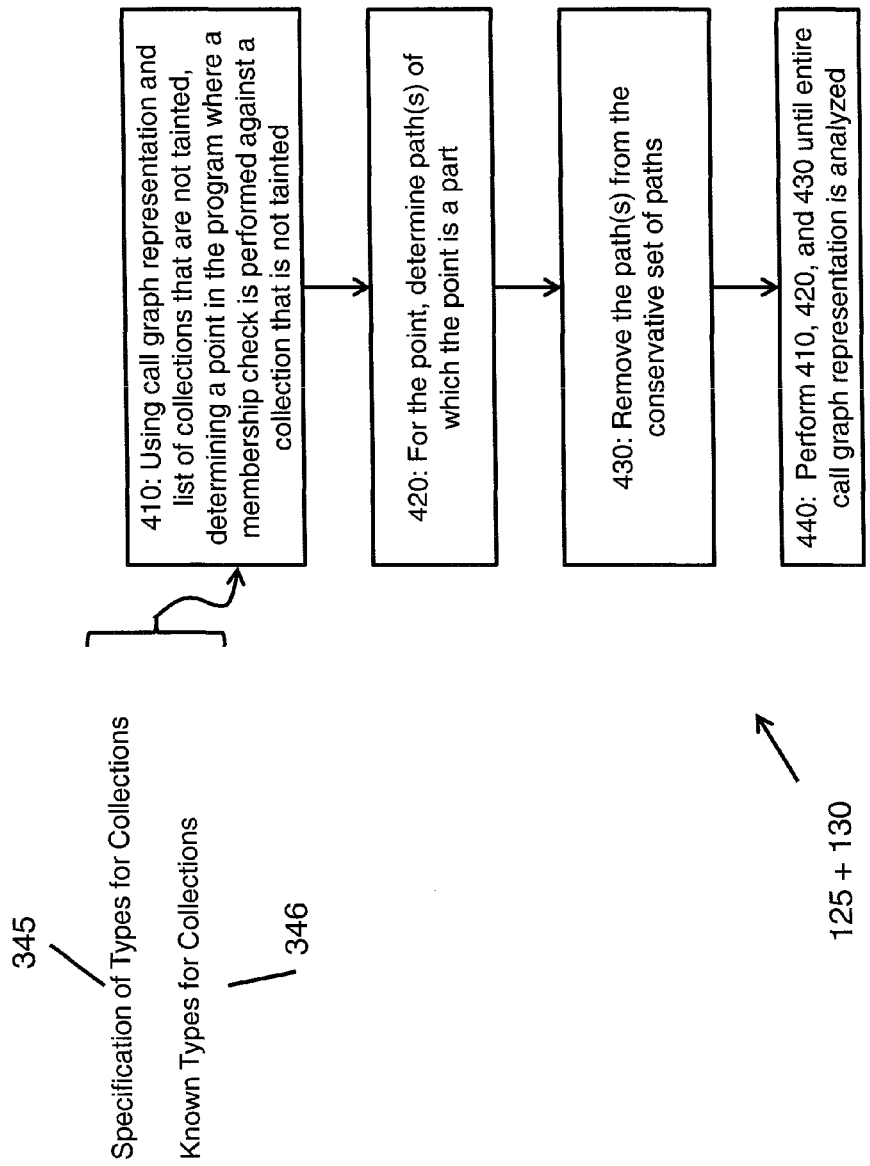

3. For each of the collections c found not to be reachable by taint, mark all the points in the program where membership checks against c are performed. See block 125 (an exemplary embodiment of which is shown in FIG. 4). Each such point is a whitelist-based validation instance, since the set of elements maintained by c at that point is known not to be controlled by the attacker. That the collection is not reachable by taint is important because otherwise a membership test against collection c might succeed due to the tainted string. That is, if the collection c is tainted (or validMessageFormats in the example given above), a corresponding measurement test (e.g., validMessageFormats.contains(•) in the example above) might succeed due to the taint.

In block 130, for each of the determined points, a path corresponding to the determined point is removed from the conservative set 160-1 of paths. This results in output 155-2, which includes in an exemplary embodiment, a reduced set 160-2 of paths. In other words, one way to describe the operations of blocks 115, 125, and 130 is these operations act like a filter, to filter out paths that are determined to have whitelist-based downgrading performed on the paths. In block 140, a security report is displayed with the reduced set 162-2 of paths.

Note that this algorithm obtains an under-approximation of the set of instances of whitelist-based validation in the computer program 111, since the taint analysis is assumed to be sound.

Figure 2:
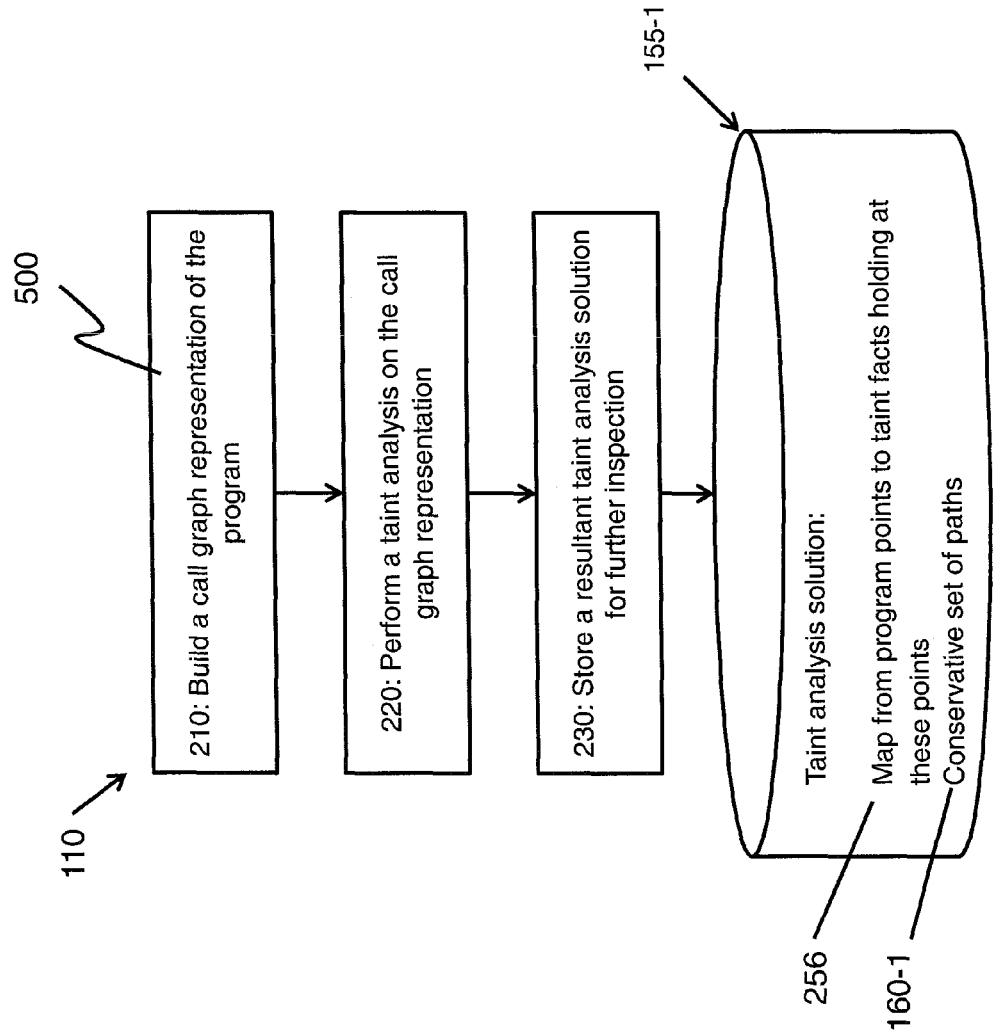
FIGS. 2-4 are flowcharts of exemplary methods for operations performed in FIG. 1.
Figure 3:
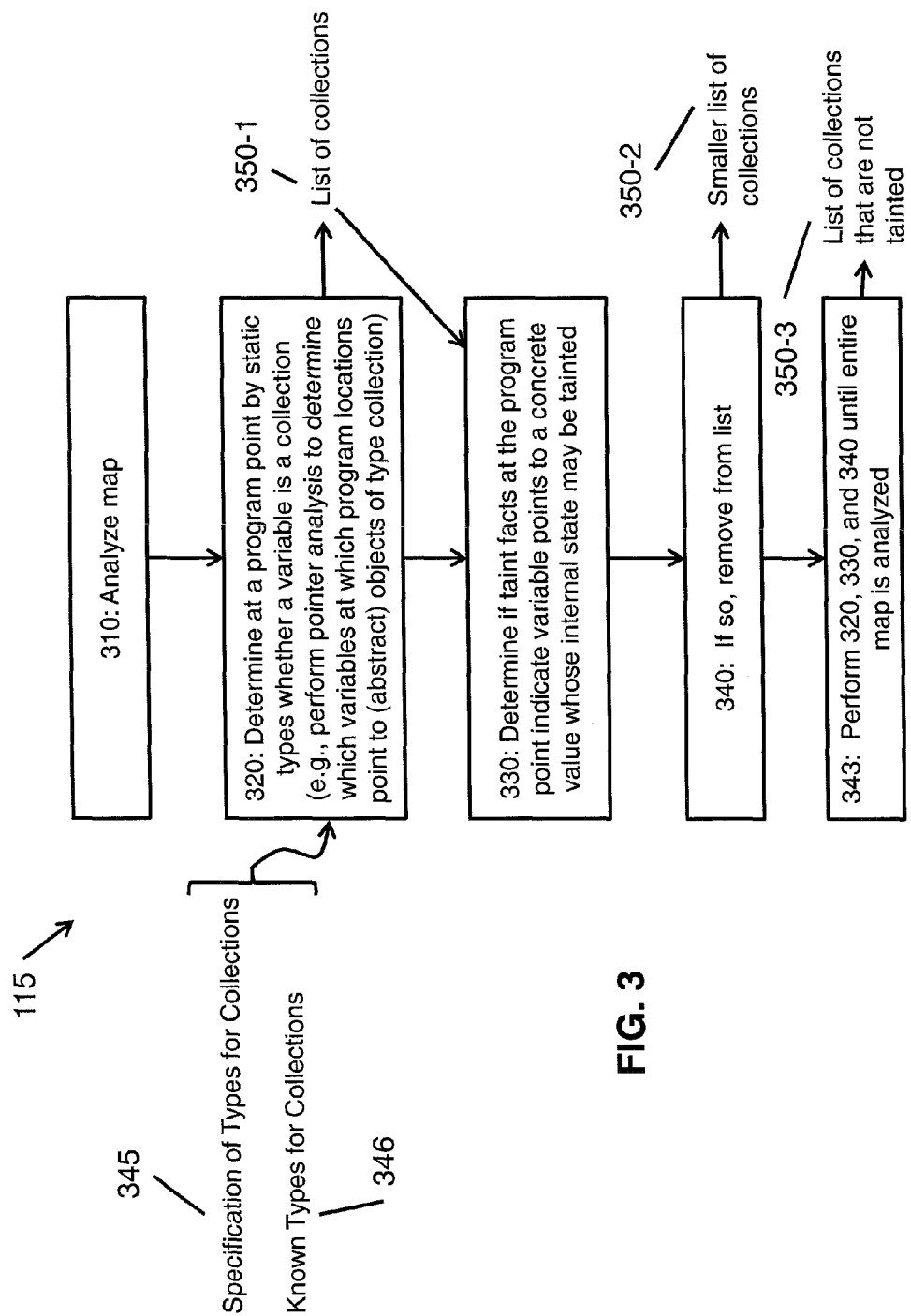

FIGS. 2-4 are flowcharts of exemplary methods for operations performed in FIG. 1. These methods may be performed, e.g., by computer readable program code executed by one or more processors. FIG. 2 is an example of block 110 from FIG. 1. That is, FIG. 2 shows exemplary operations for running a taint analysis algorithm without the algorithm being aware of instances where whitelist-based downgrading is performed. In block 210, a call graph representation 500 (see FIG. 5) of the program is built. In block 220, a taint analysis is performed on the call graph representation 500. That is, taint such as untrusted user input in the form of strings for instance is flowed from sources to sinks. In the concrete code example given above, the source request.getParameter(•) has an input corresponding to an HTML (hypertext markup language) form field for the attribute "msgFormat", this input is put into the string msgFormat, and flows into the sink response.getWriter( ).println(•). Any path where taint flows from a source to a sink is considered a potential vulnerability (where "potential" indicates that during program execution, there may be no actual vulnerability) and is placed into the conservative set 160-1 of paths. In block 230, a resultant taint analysis solution 155-1 is stored for further inspection. The resultant taint analysis solution 155-1 includes in this example a map 256 from program points to taint facts holding at these points and the conservative set 160-1 of paths.

FIG. 3 is an example of a method for performing block 115 of FIG. 1. That is, the operations in FIG. 3 determine for each variable whose type is a collection whether the variable points to a concrete value whose internal state may be tainted and assume all other collections are not tainted. The method starts in block 310, when the map is analyzed. In block 320, it is determined, at a program point and by static types, whether a variable is a collection. One technique for this is to perform pointer analysis to determine which variables at which program locations point to (abstract) objects of type collection. Block 320 will typically use known types 346 for collections. Assuming a strongly typed language, this language enables automatic identification of collections by their static type. Furthermore, these known types 346 also include which collections (and methods thereof) perform membership checks. Beyond the standard types, a user can specify additional types to be considered as collections, as indicated by the specification 345 of types for collections. The specification 345 also includes which collections (and methods thereof) perform membership checks. An exemplary output of block 320 is a list 350-1 of collections.

In block 330, it is determined if taint facts at the program point indicate variable points to a concrete value whose internal state may be tainted. If so, in block 340, the collection is removed from the list 350-1 to create a smaller list 350-2. In block 343, blocks 320, 330, and 340 are performed until the entire map is analyzed. A result of the method shown in FIG. 3 is a list 350-3 that contains only collections that are not tainted.

Referring to FIG. 4, this figure is an example of blocks 125 and 130 from FIG. 1. The method begins in block 410, when, using the call graph representation 500 and list 350-3 of collections that are not tainted, a point is determined in the program where a membership check is performed against a collection that is not tainted. The specification 345 and known types 346 may be used for block 410. In block 420, for the point, it is determined the path(s) of which the point is a part. A collection membership test can be part of many paths. As an example, imagine multiple sources and sinks, and flows between all the sources and all the sinks that first go through a collection membership test. In block 430, the path(s) are removed from the conservative set 160-1 of paths. In block 440, blocks 410, 420, and 430 are performed until the entire call graph representation 500 is analyzed. At this point, the reduced set 160-2 of paths should be available.

Figure 5:
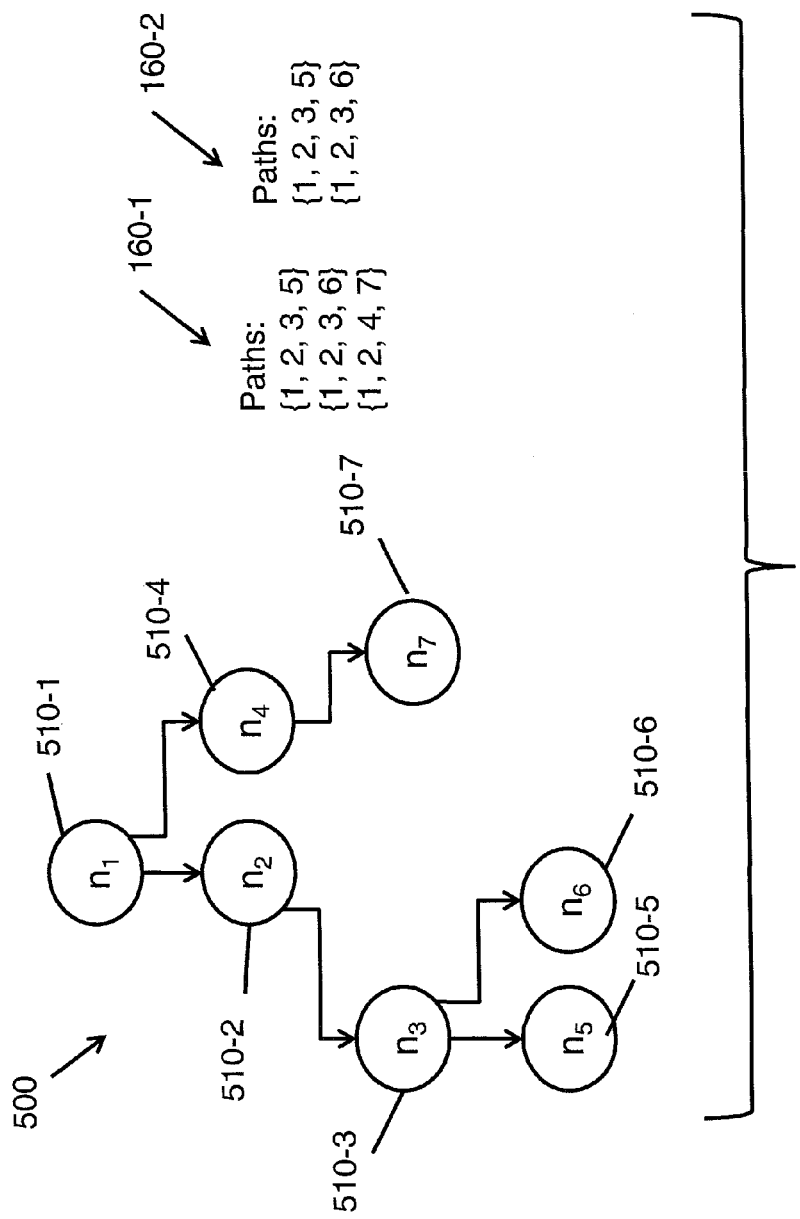
FIG. 5 illustrates a call graph representation of a computer program and paths through the call graph representation.

Turning now to FIG. 5, this figure illustrates a call graph representation 500 of a computer program and paths through the call graph representation. Nodes $n_1$ 510-1 to $n_7$ 510-7 correspond to methods and each edge indicates that one method is calling another method. Node $n_1$ 510-1 is a source and nodes $n_5$ 510-5, $n_6$ 510-6, and $n_7$ 510-7 are sinks. There are three exemplary paths indicated by the conservative set 160-1 of paths. Each path corresponds to a vulnerability. In the example of the code example presented above, the node $n_1$ 510-1 could correspond to the request.getParameter("msg-Format") statement, node $n_4$ 510-4 could correspond to the validMessageFormats.contains(msgFormat) statement, and the node $n_7$ 510-7 could correspond to the sink statement, response.getWriter( ).println(msgFormat). It is noted that the path {1, 2, 4, 7} is found during the taint analysis because the string msgFormat is potentially tainted and makes it to the sink, response.getWriter( ).println(•). Because the collection validMessageFormats is (in an example) not reachable by taint and performs a membership check against a collection, the path {1, 2, 4, 7} can be removed, resulting in the reduced set 160-2 of paths shown.

Figure 6:
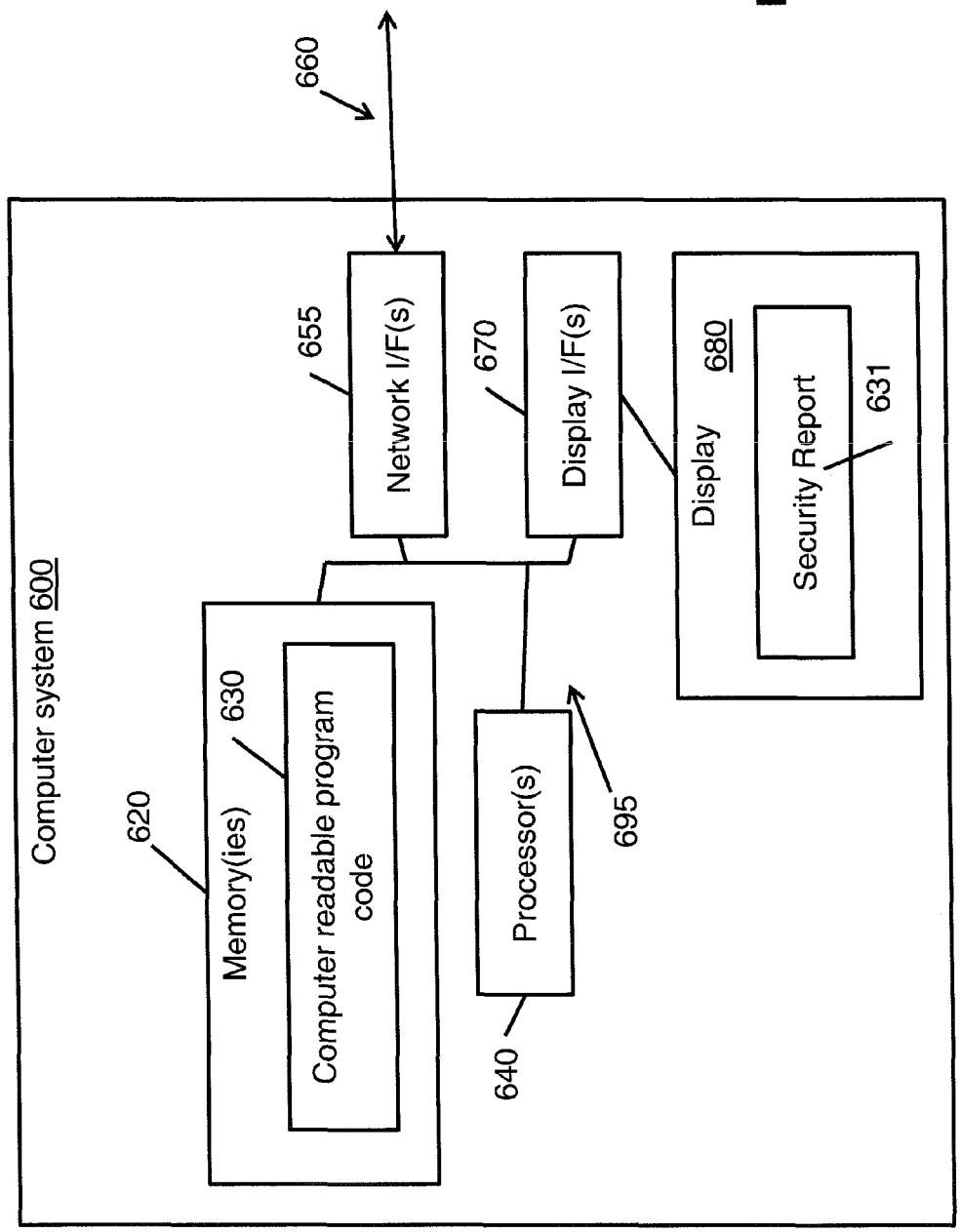
FIG. 6 illustrates an exemplary apparatus for performing embodiments of the instant invention.

FIG. 6 illustrates an exemplary apparatus for performing embodiments of the instant invention. The apparatus in this example is computer system 600. The computer system 600 includes one or more memories 620 including computer readable program code 630, one or more processors 640, one or more network interfaces 655, and one or more display interfaces 670, all interconnected by one or more buses 695. The one or more network interfaces 655 communicate using wired or wireless links 660. The display 680 may be part of or separate from the computer system 600. In this example, the display 680 presents a security report 631 to the user. The security report 631 could be the reduced set 160-2 of paths, e.g., as shown in FIG. 5, or some indication of the paths or their corresponding vulnerabilities.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
performing by a computer system taint analysis of a computer program and determining an original set of paths from sources to sinks, wherein each path corresponds to a vulnerability because taint flows from a source in the path to a sink in the path, wherein an output of the performed taint analysis includes a map from program points to taint facts holding at these points:
determining by the computer system for each variable whose type is a collection and is accessed in one of the paths in the original set of paths whether the variable points to a concrete value whose internal state is not tainted according to the taint analysis comprises:
determining by the computer system at a program point by static types whether a variable is a collection and, if so, adding the collection to a list;
determining, by the computer system using the map, if taint facts at the program point indicate the variable points to a concrete value whose internal state may be tainted and, if so, removing the collection from the list; and
performing by the computer system for all points in the computer program the determining at a program point and determining if taint facts at the program point, wherein the list indicates each variable whose type is a collection points to a concrete value whose internal state is not tainted according to the taint analysis;
for each of the collections found not to be tainted according to the taint analysis, determining by the computer system all points in the computer program where a membership check against the collection is performed; and
for each of the points, determining by the computer system corresponding paths and removing those paths from the original set of paths to create a reduced set of paths.

2. The method of claim 1, further comprising displaying by the computer system the reduced set of paths to a user.

3. The method of claim 1, wherein determining at a program point by static types whether a variable is a collection is performed at least in part by using known types for collections indicating which variables are collections.

4. The method of claim 1, wherein determining at a program point by static types whether a variable is a collection is performed at least in part by using a user supplied specification of types for collections indicating which variables are collections.

5. The method of claim 1, wherein determining all the points in the computer
program where a membership check against the collection is performed further comprises determining a membership check is performed at least in part by using known types for collections indicating which collections perform membership checks.

6. The method of claim 1, wherein a membership check against a collection
comprises a whitelist-based validator.

7. An apparatus, comprising:
one or more memories comprising computer readable program code;
one or more processors configured, in response to execution of the computer readable program code, to cause the apparatus to perform at least the following:
performing taint analysis of a computer program and determining an original set of paths from sources to sinks, wherein each path corresponds to a vulnerability because taint flows from a source in the path to a sink in the path, wherein an output of the performed taint analysis includes a map from program points to taint facts holding at these points:

determining for each variable whose type is a collection and is accessed in one of the paths in the original set of paths whether the variable points to a concrete value whose internal state is not tainted according to the taint analysis comprises:

determining at a program point by static types whether a variable is a collection and, if so, adding the collection to a list;

determining, using the map, if taint facts at the program point indicate the variable points to a concrete value whose internal state may be tainted and, if so, removing the collection from the list; and performing for all points in the computer program the determining at a program point and determining if taint facts at the program point;

wherein the list indicates each variable whose type is a collection points to a concrete value whose internal state is not tainted according to the taint analysis;

for each of the collections found not to be tainted according to the taint analysis, determining all points in the computer program where a membership check against the collection is performed; and for each of the points, determining corresponding paths and removing those paths from the original set of paths to create a reduced set of paths.

8. The apparatus of claim 7, further comprising displaying the reduced set of paths to a user.

9. The apparatus of claim 7, wherein determining at a program point by static types whether a variable is a collection is performed at least in part by using known types for collections indicating which variables are collections.

10. The apparatus of claim 7, wherein determining at a program point by static types whether a variable is a collection is performed at least in part by using a user-supplied specification of types for collections indicating which variables are collections.

11. The apparatus of claim 7, wherein determining all the points in the computer program where a membership check against the collection is performed further comprises determining a membership check is performed at least in part by using known types for collections indicating which collections perform membership checks.

12. The apparatus of claim 7, wherein a membership check against a collection comprises a whitelist-based validator.

13. A computer program product, comprising:

a non-transitory computer readable storage medium having computer readable program code embodied thereon, the computer readable program code comprising:

code for performing taint analysis of a computer program and determining an original set of paths from sources to sinks, wherein each path corresponds to a vulnerability because taint flows from a source in the path to a sink in the path, wherein an output of the performed taint analysis includes a map from program points to taint facts holding at these points;

code for determining for each variable whose type is a collection and is accessed in one of the paths in the original set of paths whether the variable points to a concrete value whose internal state is not tainted according to the taint analysis comprises:

code for determining by the computer system at a program point by static types whether a variable is a collection and, if so, adding the collection to a list;

code for determining, by the computer system using the map, if taint facts at the program point indicate the variable points to a concrete value whose internal state may be tainted and, if so, removing the collection from the list; and code for performing by the computer system for all points in the computer program the determining at a program point and determining if taint facts at the program point, wherein the list indicates each variable whose type is a collection points to a concrete value whose internal state is not tainted according to the taint analysis;

code for, for each of the collections found not to be tainted according to the taint analysis, determining all points in the computer program where a membership check against the collection is performed; and code for, for each of the points, determining corresponding paths and removing those paths from the original set of paths to create a reduced set of paths.

14. The computer program product of claim 13, further comprising displaying the reduced set of paths to a user.

15. The computer program product of claim 13, wherein determining at a program point by static types whether a variable is a collection is performed at least in part by using known types for collections indicating which variables are collections.

16. The computer program product claim 13, wherein determining at a program point by static types whether a variable is a collection is performed at least in part by using a user-supplied specification of types for collections indicating which variables are collections.

17. The computer program product of claim 13, wherein determining all the points in the computer program where a membership check against the collection is performed further comprises determining a membership check is performed at least in part by using known types for collections indicating which collections perform membership checks.

18. The computer program product of claim 13, wherein a membership check against a collection comprises a whitelist-based validator.

\* \* \* \* \*